(12) United States Patent
Eilert et al.

(10) Patent No.: US 7,650,459 B2
(45) Date of Patent: Jan. 19, 2010

(54) HIGH SPEED INTERFACE FOR NON-VOLATILE MEMORY

(75) Inventors: Sean S. Eilert, Penryn, CA (US); Rodney R. Rozman, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 405 days.

(21) Appl. No.: 11/644,270

(22) Filed: Dec. 21, 2006

(65) Prior Publication Data

US 2008/0155207 A1 Jun. 26, 2008

(51) Int. Cl.
*G06F 12/00* (2006.01)
(52) U.S. Cl. ...................................................... 711/103
(58) Field of Classification Search ........................ None
See application file for complete search history.

(56) References Cited

U.S. PATENT DOCUMENTS

2005/0086413 A1* 4/2005 Lee et al. .................... 710/313
2006/0129701 A1 6/2006 Qawami et al.
2007/0109833 A1* 5/2007 Pyeon et al. .................. 365/63
2007/0165457 A1 7/2007 Kim

OTHER PUBLICATIONS

International Search Report and Written Opinion for PCT/US2007/024346 Dated Apr. 21, 2008; 11 pages.

* cited by examiner

*Primary Examiner*—Hiep T Nguyen
(74) *Attorney, Agent, or Firm*—Blakely, Sokoloff, Taylor & Zafman LLP

(57) ABSTRACT

Various embodiments of the invention connect multiple non-volatile memory controllers in a daisy chain manner, so the multiple memory devices may be accessed from a common host controller. Data and control signals may be daisy-chained in this way, so that many memory devices may be connected together, while not increasing the loading on individual signals lines. Transfer with the various memory devices may be interleaved, so that the relatively slow times of the memory devices doesn't slow down the overall throughout of the memory stem.

9 Claims, 6 Drawing Sheets

HIGH SPEED INTERFACE FOR NON-VOLATILE MEMORY

BACKGROUND

NAND flash memory devices are typically used to store data that is to be read out in large blocks (e.g., digitized images or music). Because of the slow access times of NAND flash, several devices may be placed on a common bus in parallel and accessed at approximately the same time. When the data from each one is available, it can be read one device at a time. However, placing all those input/output (I/O) pins in parallel may cause capacitive loading that degrades the signal quality on the bus and thereby reduces the maximum useful throughput on the bus. Alternatively, accessing only one device at a time may cause the access times to accumulate, also slowing down overall throughput of the bus.

BRIEF DESCRIPTION OF THE DRAWINGS

Some embodiments of the invention may be understood by referring to following description and accompanying drawings that are used to illustrate embodiments of the invention. In the drawings.

DETAILED DESCRIPTION

Figure 1:
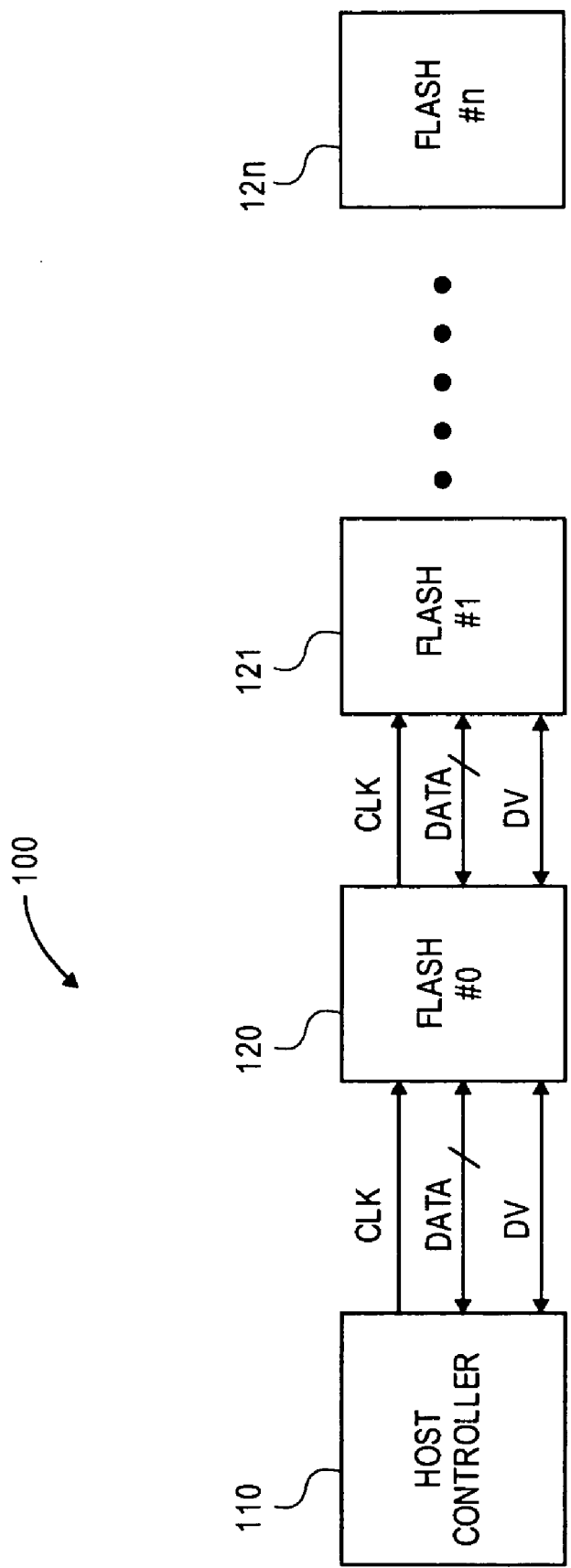
FIG. 1 shows a block diagram of a non-volatile memory system, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Various embodiments of the invention may connect multiple flash memory controllers in a daisy chain manner, so that multiple memory devices may be connected together without the bus loading and inherent signal degradation caused by connecting the device pins in parallel. Signals may also be passed through each controller quickly if the device is merely being used as a pass-through station for another device, or may be buffered for reading and writing to the associated memory array. In some embodiments, each memory device comprises a single integrated circuit containing a memory array and an associated memory controller to control the operations of that memory array, as well as to control passthrough operations in which commands or data that are addressed to other memory devices are passed through the controller for the use of those other devices. Some embodiments comprise a host controller, separate from the memory devices, that initiates commands and write data to the memory devices, and may also receive read data from the memory devices. Note: although the descriptions and drawing frequently refer to flash memory, and in particular to NAND flash memory, the principles described may also be used with other types of non-volatile memory in which the access times are long enough to warrant sequentially accessing each of multiple memory devices for an otherwise contiguous block of data, and in which placing these devices in parallel on a common bus can cause unacceptable bus loading.

FIG. 1 shows a non-volatile memory system, according to an embodiment of the invention. In the illustrated system 100, a host controller 110 may provide overall control of a quantity of n+1 flash memory devices labeled #0, #1, . . . #n, which are numbered 120 through 12n. A clock signal CLK may be originated by the host controller and passed to the first memory device 120, which passes CLK to the next memory device 121, and so forth until CLK reaches the last memory device in the chain, memory device 12n. Data may be passed in both direction over multiple parallel data lines, collectively labeled DATA in the drawing. The number of parallel data lines may be any feasible quantity, such as but not limited to 4, 8, 16, 32, etc. Write data may be originated in the host controller and passed from memory device to memory device until it reaches the designated memory device, where it is written into that device's internal memory array. Read data may be originated in the selected memory device, and passed through multiple memory devices until it reaches the host controller, which may then process the data. Power connections to the various devices are not shown to avoid cluttering the drawing.

Figure 2:
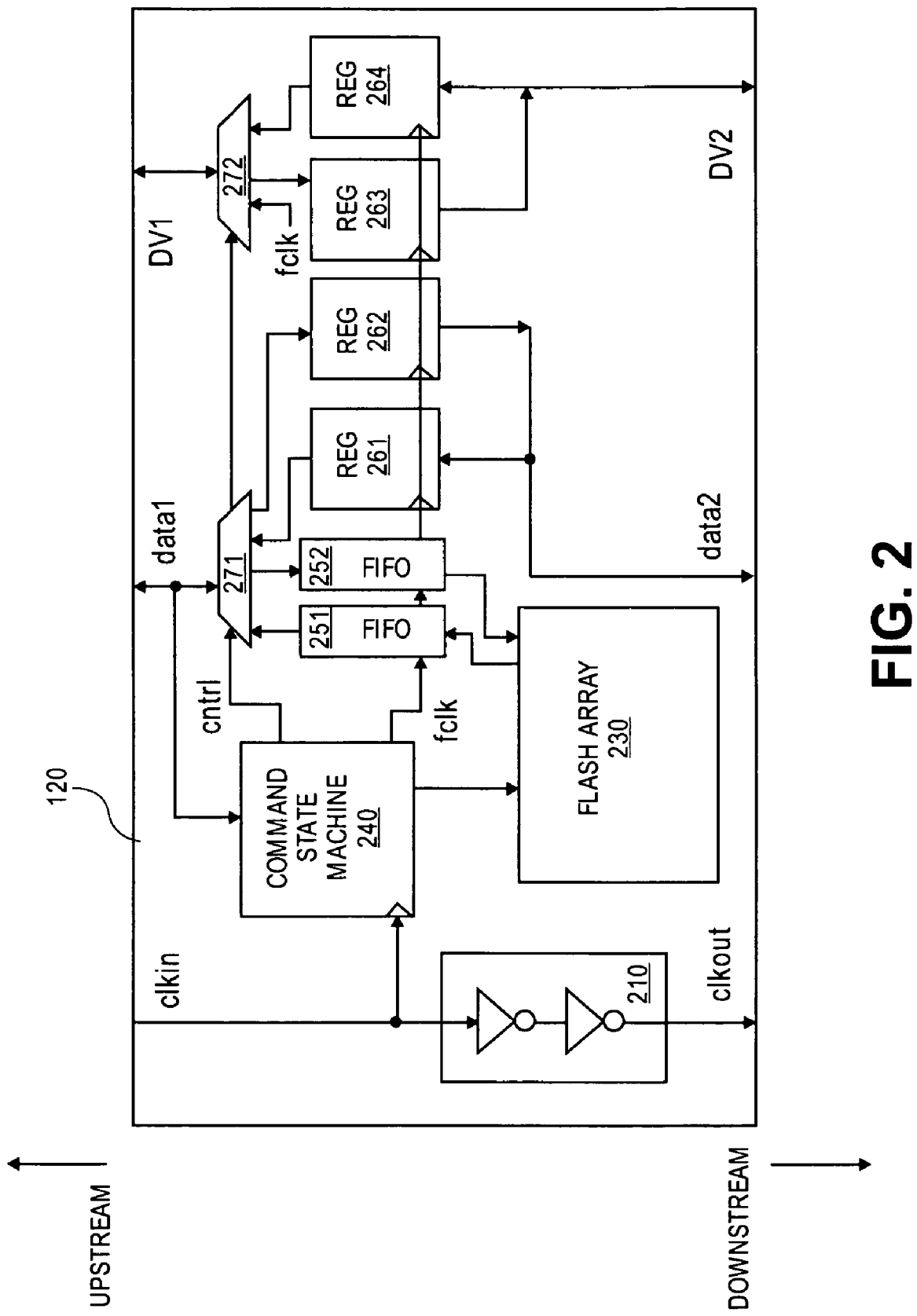
FIG. 2 shows a block diagram of a memory device, according to an embodiment of the invention.

FIG. 2 shows a block diagram of a memory device, according to an embodiment of the invention. In the illustrated embodiment, the clock, data, and data valid (DV) lines correspond to their counterparts in FIG. 1. The flash memory device is numbered 120, but may correspond to any of the flash memory devices shown in FIG. 1. Flash array 230 includes the actual memory portion of the flash memory device, the portion in which data may be stored for use by other devices. As shown in the drawing, the clock signal CLK that originates in the host controller may be brought in through the clkin input and used to clock the command state machine 240, and may also be passed through from clkin to clkout, using a buffer 210 to reduce the loading that would occur if all the memory devices were tied directly to the same clock line. The command state machine 240 may be used to control overall operations in the flash memory device, based on commands brought in through the data1 lines.

For ease of description, within the context of this document 'upstream' indicates data moving toward the host controller, while 'downstream' indicates data moving away from the host controller. For example, in FIG. 1 device 121 would be downstream from device 120, while device 120 would be upstream from device 121. The host controller 110 would be upstream from all the memory devices 12x.

Returning to FIG. 2, the data signals may be going either upstream or downstream, and may either be passed through the memory device, or originate in the memory device, or be destined for the memory device. Multiplexer/demultiplexer (mux/demux) 271 may be used to provide the proper data path, under control of the command state machine 240, for data traveling in either direction between this device and the next upstream device. Mux/demux 271 may route downstream data from data1 to register 262, where it may be latched and made available to the next downstream device at data2. Similarly, upstream data from data2 that has been latched in register 261 may be made available by mux/demux 271 at data1 for passthrough to the next upstream device. Although mux/demux 271 is shown as a single functional circuit, in some embodiments it may be implemented as a multiplexer and a separate demultiplexer.

To provide proper timing for passthrough data, a data valid (DV) signal may also be passed through in either direction, with the downstream signal being latched in register 263 and the upstream signal being latched in register 264. Under certain circumstances, such as when the memory device is providing data from its own memory array instead of passing through data from another memory device, the mux/demux 272 may be set to provide a timing signal fclk at DV1 instead of passing through the DV signal from a downstream device. In some embodiments the signal fclk may be a clock signal that is derived from clkin, but which is only active at certain times, under control of the command state machine 240.

When the host controller is attempting to read data from this particular flash memory device, the data read from flash array 230 may be placed in first-in-first-out buffer (FIFO) 251, from where the mux/demux 271 may select it for presentation at data1 for reading by the next upstream device. When the host controller is attempting to write data into this particular memory device, the data at data1 may be routed to FIFO 252 by mux/demux 271, from where it may be written into the flash array.

The FIFOs may be used to allow for differences in the data transfers rate between the array, which may have a comparatively slow data transfer rate, and the daisy-chain bus, which may have a comparatively high data transfer rate. In some embodiments, a page (or other block-size) of data may be fully written into FIFO 251 by array 230, before that data is passed upstream through data1. Similarly, a full block of data may be written into FIFO 252 through data1, before that data is written from FIFO 252 into array 230.

This technique of buffering in the FIFOs may be used advantageously to increase overall throughput of a memory system, by performing an operation with one memory device while another memory device is making an internal transfer with its FIFO. For example, memory device #0 may be instructed to read data from its array. While it is moving that data from its array to its FIFO, memory device #1 may be instructed to read data from its own array. Similar read operations may then be started with other memory devices. By the time all the read operations have been started, memory device #0 may have filled its FIFO, and can transfer that data to the host controller. When that transfer is complete, memory device #0 may be instructed to read another block of data from its array, which it will begin placing into its FIFO. By now, memory device #1 may have filled its FIFO, and can transfer that data to the host controller and be instructed to read another block of data into its FIFO. This process may continue with the remaining memory devices until they have all transferred their data to the host controller. By then, memory device #0 may be instructed to transfer its second block of data from its FIFO to the host controller, and the process can repeat. This process of alternating between different memory devices may continue until all the necessary data has been transferred. A similar process may be followed for write operations, by writing data into each memory device's FIFO in sequence, and letting one device write the data from its FIFO into its array while the other devices are receiving their data from the host controller. Although this process has been described as selecting the memory devices in the order in which they are daisy-chained together, some operations may select the devices in a different order.

It should be noted that all internal data paths, although indicated in the drawing with a single line, may actually contain multiple parallel lines, which in some embodiments will be equal in number to the number of parallel data lines between memory devices. Similarly, FIFOs 251 and 252, registers 261 and 262, and mux/demux 271 may all be configured to handle the required number of parallel signals.

Figure 3A:
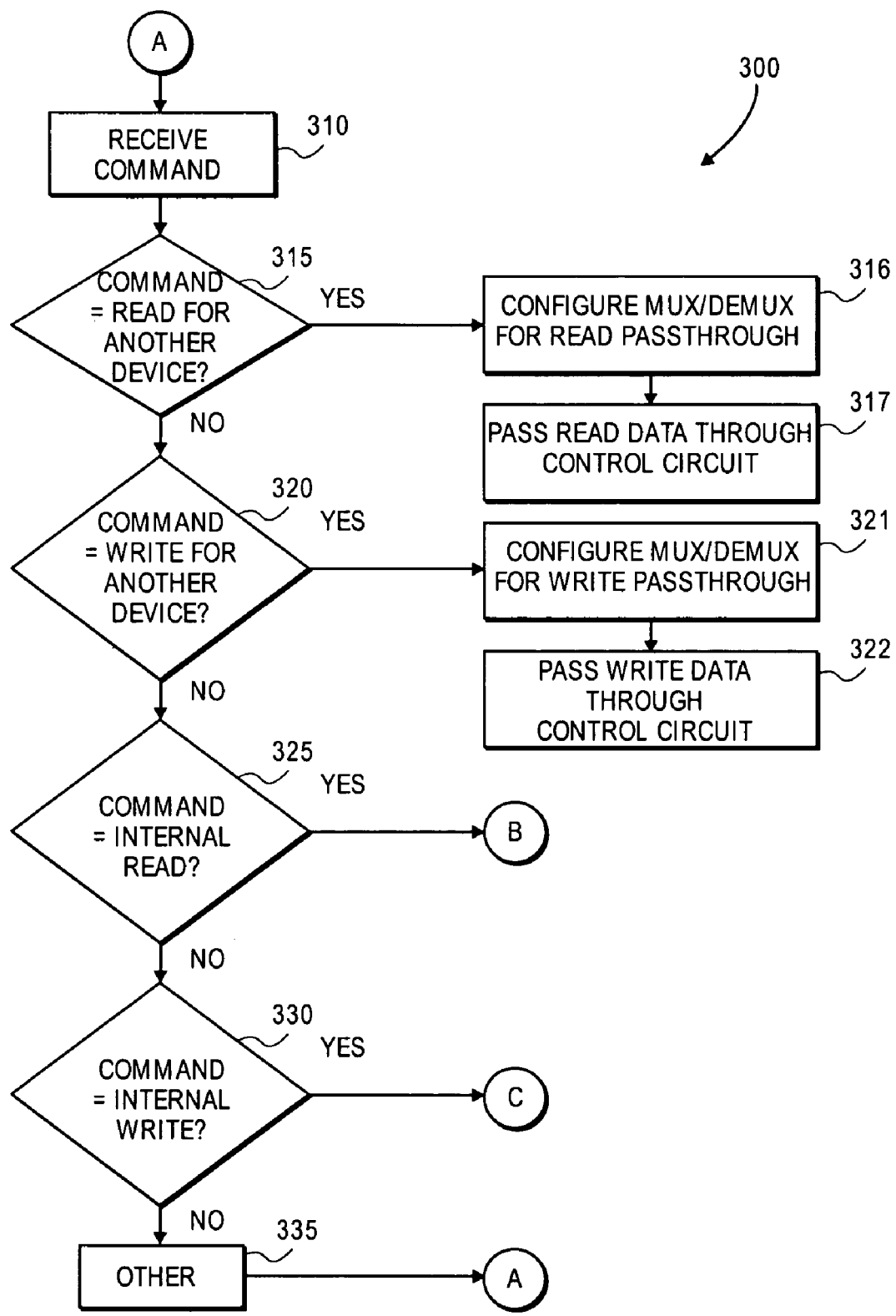
FIGS. 3A, 3B, and 3C show a flow diagram of a method performed by a memory device, according to an embodiment of the invention.
Figure 3B:
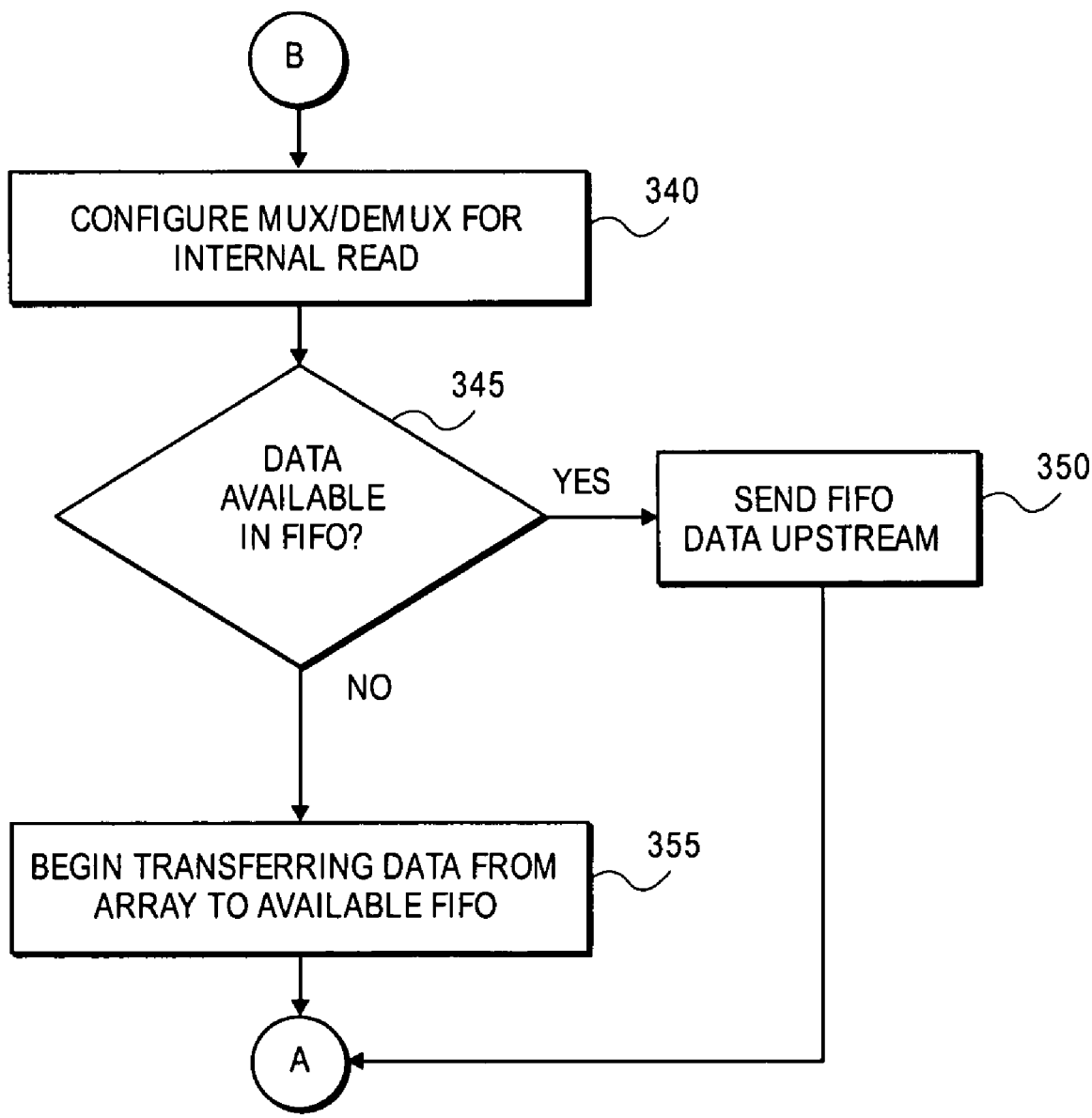
Figure 3C:
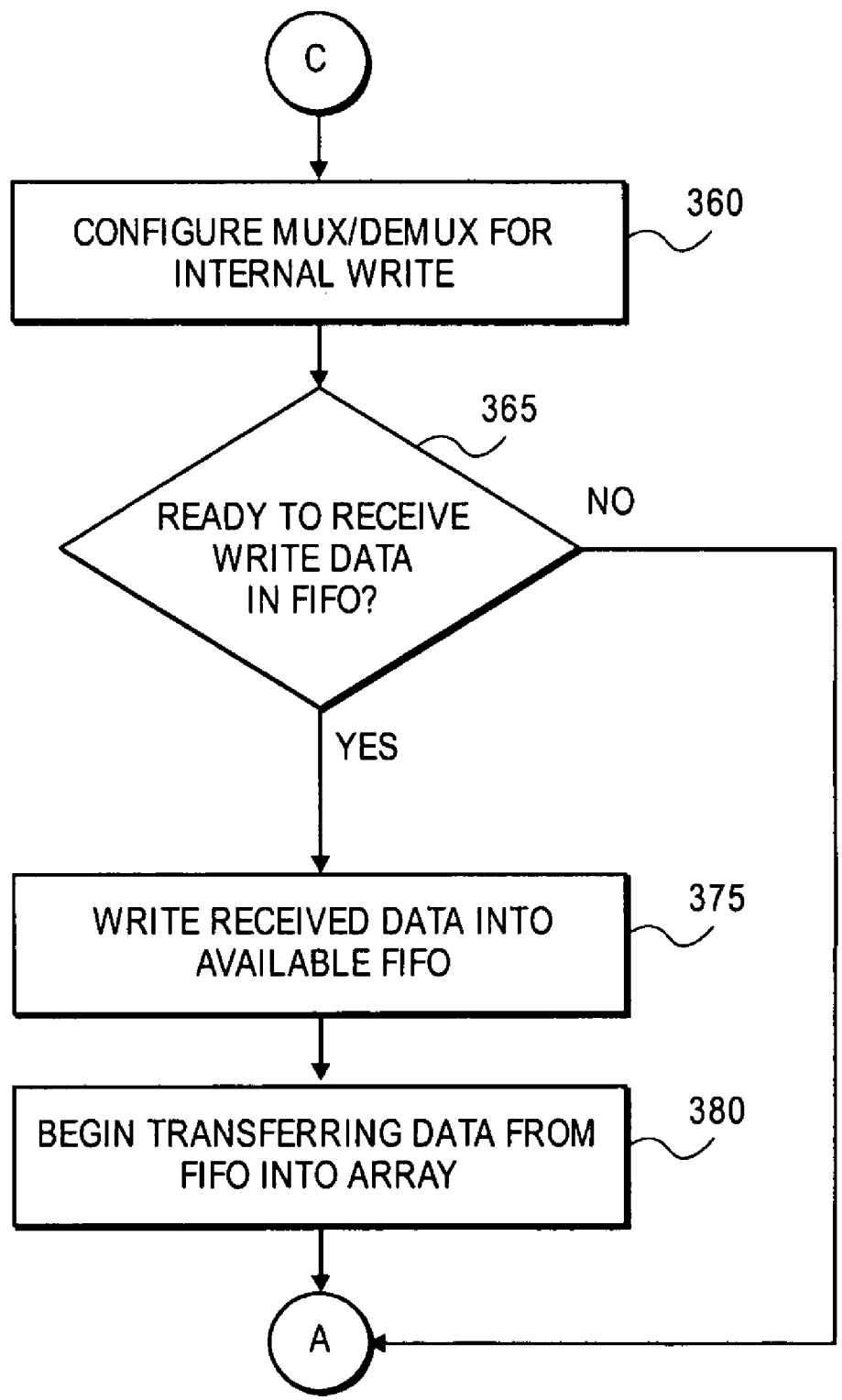

FIGS. 3A, 3B, and 3C show a flow diagram of a method performed by a memory device, according to an embodiment of the invention. In the illustrated embodiment of flow diagram 300, the memory device receives a command at 310. The command may be one of several different types of commands. If the command is a read command that is addressed to another memory device, as determined at 315, the current memory device may configure its internal multiplexer/demultiplexer (e.g., mux/demux 271 of FIG. 2) for a read passthrough operation at 316. When the read data from the selected downstream memory device is received, either directly or indirectly through another downstream device, this read data may be passed upstream through the current memory device's control circuitry at 317.

If the command was a write command for another device as determined at 320, then the current memory device may configure its mux/demux for a passthrough write operation at 321. When the write data from the host controller is received, either directly or indirectly through another upstream device, this write data may be passed downstream through the current memory device's control circuitry at 322.

If the command was a read command addressed to this memory device, as determined at 325, then the process may continue in FIG. 3B. The memory device may configure its mux/demux for an internal read at 340. If previously-requested data is available in the FIFO, as determined at 345, that data may be sent from that FIFO to the next upstream device at 350, from where it may be passed through to the host controller. If the FIFO is empty, then the memory device may use the read command to trigger the transfer of data from its own array to its FIFO at 355. Once the memory device has completed transferring its FIFO data upstream at 350, or has begun transferring data from its array into its FIFO at 355, it may return to 'A' in FIG. 3A to await the next command. The operation at 355 may continue to completion even after the memory device has returned to A.

Returning to FIG. 3A, if the command indicated at 310 was a write command addressed to this memory device, as determined at 330, then the process may continue in FIG. 3C. The memory device may configure its mux/demux for an internal write at 360. If the FIFO is not ready to receive more data because it still contains data from a previous write operation as determined at 365, then the memory device may do nothing (other than continue to write the remaining data from the FIFO into the array), and return to A to await another command. If the FIFO is ready to receive data, as determined at 365, then that data may be received from upstream and written into the FIFO at 375. Once the data is in the FIFO, that data may begin to be written into the array at 380. Once the transfer of new data into the FIFO at 375 has been completed, and the transfer of data into the array has begun at 380, the transfer of data into the array may continue to completion, even after the memory device has returned to A to await another command.

If a command was received at 310 that was something other than the four commands just described, then the memory device may move to whatever other processing (not described) is required at 335. In some embodiments, the memory device may return a 'busy' or 'error' status if it is not ready to perform any of the described options when it receives a command from the host controller.

Figure 4:
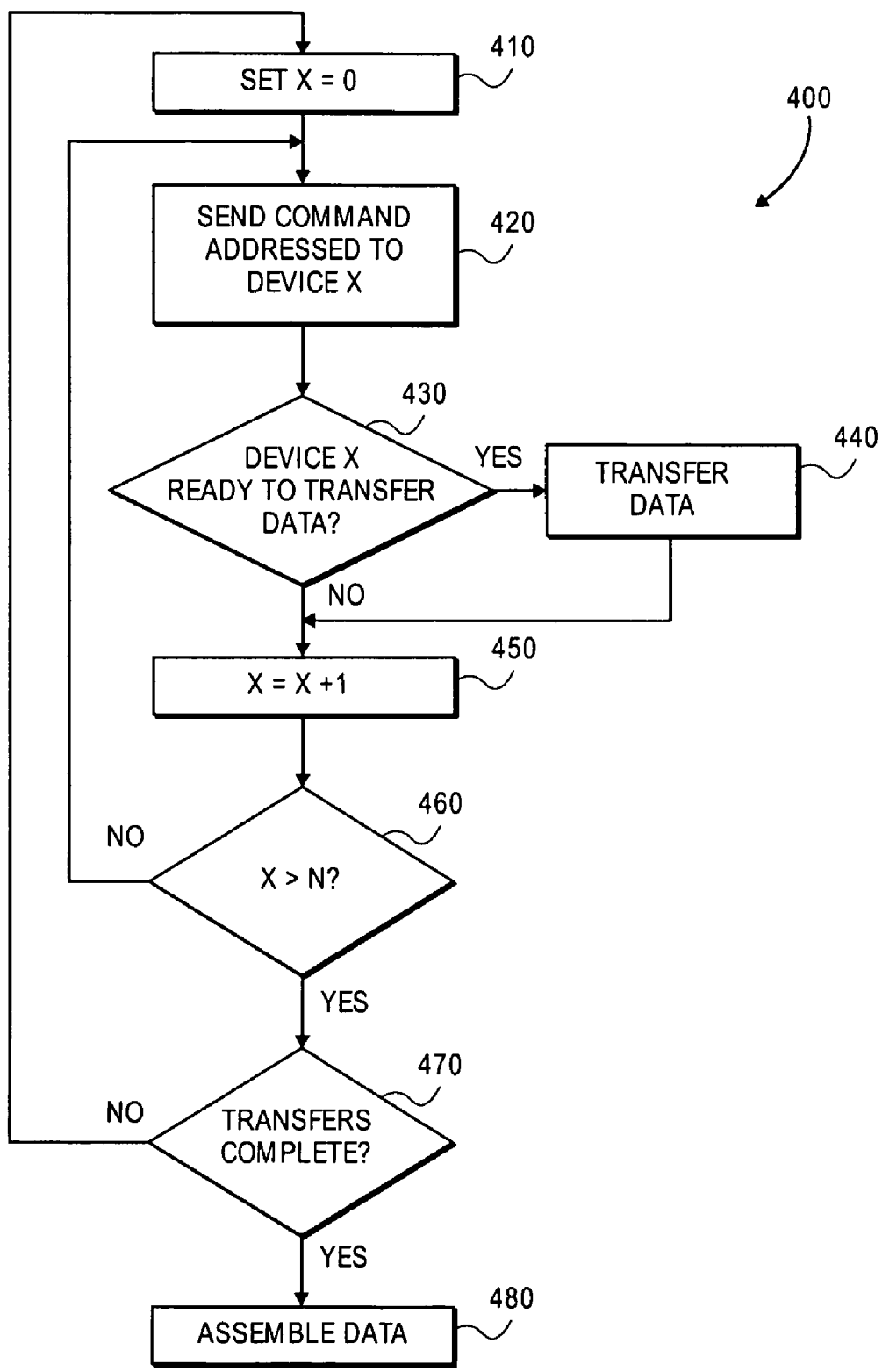
FIG. 4 shows a flow diagram of a method performed by a host controller, according to an embodiment of the invention.

FIG. 4 shows a flow diagram of a method performed by a host controller, according to an embodiment of the invention. In some embodiments, this may be the host controller 110 of FIG. 1. In the illustrated flow diagram 400, the host controller selects the first of multiple memory devices at 410 and sends a command over the daisy-chain bus that is addressed to that memory device at 420. For simplicity of description, incrementing values of X=0 through X=n are used here to represent sequentially addressing the various memory devices 0 through n, but other embodiments may use other procedures to identify and select the various memory devices. If the selected memory device is ready to transfer data as determined at 430, the host controller may perform the data transfer at 440. 'Ready to transfer data' means that the selected memory device has data in its FIFO ready to transfer to the host controller (in the case of a read command), or the selected memory device has an available FIFO ready to receive data from the host controller (in the case of a write command). After the data transfer (or immediately if no data was transferred), the host controller may select the next memory device (X=X+1) at 450 and repeat the process with that newly-selected memory device. When all the intended memory devices have been communicated with in this manner, as determined at 460, the host controller may continue operations with the first memory device and repeat the sequence with more read or write data. When all the transfers have been completed as determined at 470, the host controller may continue with other processing. In some embodiments, in the case of a read operation, all the data from the data transfers to the host controller may be correctly assembled into a single block of data at 480. Future data transfers may begin again later at 410. Similarly, in the case of a write operation, a block of data may initially be separated into various parts, each of which is sent separately to various FIFOs in various memory devices.

The foregoing description is intended to be illustrative and not limiting. Variations will occur to those of skill in the art. Those variations are intended to be included in the various embodiments of the invention, which are limited only by the spirit scope of the following claims.

What is claimed is:

1. An apparatus, comprising
 a controller to control operations of first and second non-volatile memory devices connected in a daisy-chain manner, the controller to:
 issue a first command to the first device to transfer first data to the controller;
 issue a second command to the second device, subsequent to said issuing the first command, to transfer second data to the controller;
 receive a first part of the first data from the first device, subsequent to said issuing the second command;
 receive a first part of the second data from the second device, subsequent to said receiving the first part of the first data;
 receive a second part of the first data from the first device, subsequent to said receiving the first part of the second data; and
 receive a second part of the second data from the second device, subsequent to said receiving the second part of the first data.

2. The apparatus of claim 1, further comprising assembling the first and second parts of the first data and the first and second parts of the second data into a single block of data, subsequent to issuing read commands as the first and second commands.

3. The apparatus of claim 1, further comprising separating a single block of data into the first and second parts of the first and second data, prior to issuing write commands as the first and second commands.

4. A method, comprising:
 issuing a first command from a controller to a first memory device to transfer first data to the controller;
 issuing a second command from the controller to a second device, subsequent to said issuing the first command, to transfer second data to the controller;
 receiving, by the controller, a first part of the first data from the first device, subsequent to said issuing the second command;
 receiving, by the controller, a first part of the second data from the second device, subsequent to said receiving the first part of the first data;
 receiving, by the controller, a second part of the first data from the first device, subsequent to said receiving the first part of the second data; and
 receiving, by the controller, a second part of the second data from the second device, subsequent to said receiving the second part of the first data.

5. The method of claim 4, further comprising assembling, in the controller, the first and second parts of the first data and the first and second parts of the second data into a single block of data, subsequent to issuing read commands as the first and second commands.

6. The method of claim 4, further comprising separating, in the controller, a single block of data into the first and second parts of the first and second data, prior to issuing write commands as the first and second commands.

7. An article comprising
 a tangible machine-readable medium that contains instructions, which when executed by one or more processors result in performing operations comprising:

issuing a first command from a controller to a first memory device to transfer first data to the controller;

issuing a second command from the controller to a second device, subsequent to said issuing the first command, to transfer second data to the controller;

receiving, by the controller, a first part of the first data from the first device, subsequent to said issuing the second command;

receiving, by the controller, a first part of the second data from the second device, subsequent to said receiving the first part of the first data;

receiving, by the controller, a second part of the first data from the first device, subsequent to said receiving the first part of the second data; and receiving, by the controller, a second part of the second data from the second device, subsequent to said receiving the second part of the first data.

8. The article of claim 7, wherein the operations further comprise assembling, in the controller, the first and second parts of the first data and the first and second parts of the second data into a single block of data, subsequent to issuing read commands as the first and second commands.

9. The article of claim 7, wherein the operations further comprise separating, in the controller, a single block of data into the first and second parts of the first and second data, prior to issuing write commands as the first and second commands.

* * * * *

UNITED STATES PATENT AND TRADEMARK OFFICE
CERTIFICATE OF CORRECTION

PATENT NO. : 7,650,459 B2
APPLICATION NO. : 11/644270
DATED : January 19, 2010
INVENTOR(S) : Eilert et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twenty-eighth Day of December, 2010

David J. Kappos
*Director of the United States Patent and Trademark Office*